United States Patent [19]

Shashua et al.

[11] Patent Number: 5,745,636
[45] Date of Patent: Apr. 28, 1998

[54] SYSTEM AND METHOD FOR RENDERING IMAGES

[75] Inventors: Amnon Shashua, Cambridge; Tomaso Poggio, Wellesley, both of Mass.

[73] Assignee: GenTech Corp., Tokyo, Japan

[21] Appl. No.: 699,543

[22] Filed: Aug. 19, 1996

Related U.S. Application Data

[62] Division of Ser. No. 293,742, Aug. 22, 1994, Pat. No. 5,550,641, which is a continuation of Ser. No. 700,703, May 15, 1991, abandoned.

[51] Int. Cl.$^6$ ....................................................... H04N 5/91
[52] U.S. Cl. ......................................... 386/46; 386/128
[58] Field of Search ............................. 386/46, 128, 129, 386/117, 118, 119, 95, 107, 28, 42; 348/370, 371; H04N 5/91, 7/00, 5/76

[56] References Cited

U.S. PATENT DOCUMENTS 4,881,128  11/1989  Yamada ................................... 348/370
4,888,641  12/1989  Wilson ..................................... 348/371

*Primary Examiner*—Robert Chevalier
*Attorney, Agent, or Firm*—Richard A. Jordan

[57] ABSTRACT

An image processing system comprising and image recording system and an image rendering system. The image recording system records images of a scene, and comprises a recording device for recording images of the scene on a series of frames, each frame including image information reflecting the scene as illuminated at the time the frame was recorded, a plurality of individually-energizable light sources each for illuminating the scene; and a synchronizer connected to the recording device and the light sources for synchronizing the separate energization of the light sources and the recording by the recording device of the separate frames in the series. The image rendering system generates a rendered image which reflects a desired light source position. The image rendering system specifically comprises a frame store for storing the image information for each of the series of frames, a rendered image store for receiving rendered image information a rendered image a rendered image information generator for generating rendered image information for storage in response to image information from the frame store related to frames of the series as recorded in synchrony with diverse ones of the light sources, the rendered image information generator generating the rendered image information in relation to the image information of each of the frames, as weighted in relation to the relationship between the position of the light sources in synchrony with which the frame was recorded and the desired position of the light source for the rendered image.

10 Claims, 9 Drawing Sheets

FIG. 5A

SPECULAR CORRECTION

50. GENERATE AT LEAST ONE FOUR-FRAME SET TO BE USED IN GENERATING AN IMAGE

↓

51. SELECT CORRESPONDING PIXELS FROM ALL FOUR FRAMES WHICH ARE NOT SPECULAR

↓

52. DETERMINE VALUES FOR COEFFICIENTS DEFINING LINEAR RELATIONSHIP OF PIXEL VALUES AMONG FRAMES

↓

53. APPLY LINEAR RELATIONSHIP TO ALL PIXELS OF ALL FRAMES TO IDENTIFY PIXELS IN EACH FRAME WHICH DO NOT FOLLOW RELATIONSHIP

↓

54. FOR EACH PIXEL IN EACH FRAME WHICH DOES NOT FOLLOW LINEAR RELATIONSHIP, DETERMINE A CORRECTION VALUE AND APPLY TO GENERATE A CORRECTED NON-SPECULAR PIXEL VALUE

↓

55. GENERATE RENDEERED IMAGE USING CORRECTED FRAMES AND DESIRED LOCATION OF LIGHT SOURCE

↓

56. ADD SPECULARITIES AS NECESSARY

F I G. 6B (CONT)
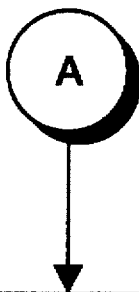
95. USING (1) DISTANCE BETWEEN POINT OF INTERSECTION AND SHADOWED REGION EDGE, (2) THE ANGLE OF ACTUAL LIGHT SOURCE, AND (3) DISTANCE BETWEEN POINT OF INTERSECTION AND DESIRED POINT DETERMINE AN ANGLE VALUE (a)
96. REPEAT FOR ALL FRAMES
97. IF ANGLE VALUE FOR ACTUAL POINT (P) IS LESS THAN ANGLE OF VALUES (A) FOR ALL FRAMES, ASSIGN POINT (P) TO SHADOW REGION

SYSTEM AND METHOD FOR RENDERING IMAGES

This is a divisional of application Ser. No. 08/293,742 filed on Aug. 22, 1994, now U.S. Pat. No. 5,550,641 which is a continuation of application Ser. No. 07/700,703 filed on May 15, 1991 now abandoned.

FIELD OF THE INVENTION

The invention relates generally to the field of rendering of visual images, and more specifically provides an arrangement for adjusting and modifying the apparent direction and amplitude of the illumination of a scene in the rendered image.

BACKGROUND OF THE INVENTION

In rendering of a visual image, the direction and intensity of the illumination are generally important considerations in the effect of the image on the person viewing the image. The direction, intensity and variation in lighting across an image may effect such things as the mood of the viewer in viewing the image and may also tend to high-light certain aspects of the image which are of artistic importance in the rendering of the image.

In making a motion picture, for example, a scene may be recorded several times, with the scene being illuminated from a number if diverse directions each time it is recorded. During the editing process, the director may select one of the recorded scenes to be put into the final motion picture. In some instances, the director may determine that none of the scenes are acceptable, and have to assemble the cast and retake the scene with appropriate lighting. In any case, such additional effort to take one scene can be an expensive and time-consuming process.

Similarly, a still photographer may take a number of photographs of a person or an object, with the illumination being provided from a number of directions. After the photographs are printed, the photographer may select one or several prints which are most pleasing to him or her, or which achieves the lighting effect which he or she wishes to have in the photograph. If none of the prints have the visual effects desired by the photographer, he or she may attempt to "touch up" one or several to attempt to reach the desired effects, or if possible to take additional photographs, all of which can be an expensive and time-consuming process.

SUMMARY OF THE INVENTION

The invention provides a new and improved method and system for recording a scene, by, for example, photographic, video or digital techniques, in such a way that the intensity and direction of the apparent illumination of the scene can be easily and inexpensively modified when the image is rendered. The invention further provides a new and improved method and system for taking the recorded visual images taken during the recording process and for modifying and adjusting the apparent intensity and direction of the illumination in the rendered image.

In brief summary, the invention in one aspect provides an image processing system comprising and image recording system and an image rendering system. The image recording system records images of a scene, and comprises a recording device for recording images of the scene on a series of frames, each frame including image information reflecting the scene as illuminated at the time the frame was recorded, a plurality of individually-energizable light sources each for illuminating the scene; and a synchronizer connected to the recording device and the light sources for synchronizing the separate energization of the light sources and the recording by the recording device of the separate frames in the series. The image rendering system generates a rendered image which reflects a desired light source position. The image rendering system specifically comprises a frame store for storing the image information for each of the series of frames, a rendered image store for receiving rendered image information a rendered image information generator for generating rendered image information for storage in response to image information from the frame store related to frames of the series as recorded in synchrony with diverse ones of the light sources, the rendered image information generator generating the rendered image information in relation to the image information for each of the frames, as weighted in relation to the relationship between the position of the light sources in synchrony with which the frame was recorded and the desired position of the light source for the rendered image.

In another aspect, the invention provides an image processing system comprising and image recording system and an image rendering system. The image recording system records images of a scene, and comprises a recording device for recording images of the scene on a series of frames, each frame including image information reflecting the scene as illuminated at the time the frame was recorded, a plurality of individually-energizable light sources each for illuminating the scene; and a synchronizer connected to the recording device and the light sources for synchronizing the separate energization of the light sources and the recording by the recording device of the separate frames in the series.

In yet another aspect, the invention provides an image rendering system for generating a rendered image which reflects a desired light source position in response to frame information relating to a series of frames recorded in response to a light sources having diverse positions. The image rendering system comprises a frame store for storing the image information for each of the series of frames, a rendered image store for receiving rendered image information a rendered image a rendered image information generator for generating rendered image information for storage in response to image information from the frame store related to frames of the series as recorded in synchrony with diverse ones of the light sources, the rendered image information generator generating the rendered image information in relation to the image information of each of the frames, as weighted in relation to the relationship between the position of the light sources in synchrony with which the frame was recorded and the desired position of the light source for the rendered image.

In yet a further aspect, the invention provides an image rendering system for generating a rendered image which reflects a desired light source position in response to frame information relating to a series of frames recorded in response to a light sources having diverse positions, and which generates information regarding specularities in the rendered image. The image rendering system comprises a frame store for storing the frame image information for each of the series of frames, the frame image information having a specular component and a non-specular component, a rendered image store for receiving rendered image information a rendered image and a rendered image information generator. The rendered image information generator comprises a specular correction portion for generating from the frame image information intermediate image information representing the non-specular component of the frame image information and a non-specular rendered image information generator for generating rendered image information for storage in response to intermediate image information store related to frames of the series as recorded in synchrony with diverse ones of the light sources, the non-specular rendered image information generator generating the rendered image information in relation to the intermediate image information for each of the frames, as weighted in relation to the relationship between the position of the light sources with which each of the frame was recorded and the desired position of the light source for the rendered image. In one embodiment, the specular correction portion comprise a relationship-determining portion for determining a linear relationship among non-specular portions of the frame image information of the frames, an error value determining portion for determining pixel error values in response to differences between the determined linear relationship and actual pixel values of the frames for each pixel and a correction generating portion for generating a corrected pixel value in response to the actual pixel values and the pixel error values.

In yet another aspect, the invention image rendering system for generating a rendered image which reflects a desired light source position in response to frame information relating to a series of frames recorded in response to a light sources having diverse positions. The image rendering system comprises a frame store for storing the frame image information for each of the series of frames, the frame image information having a shadowed region and an unshadowed region, a rendered image store for receiving rendered image information representing a rendered image and a rendered image information generator. The rendered image information generator comprises a non-shadowed rendered image information generator for generating rendered image information for storage in response to intermediate image information store related to frames of the series as recorded in synchrony with diverse ones of the light sources, the non-specular rendered image information generator generating the rendered image information in relation to the intermediate image information for each of the frames, as weighted in relation to the relationship between the position of the light sources with which each of the frame was recorded and the desired position of the light source for the rendered image, and a shadowed-region determining element for identifying from the shadowed region portion of the frame image information shadowed portions of the rendered image information.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 5A and 5B comprise a flow chart describing a procedure for processing in connection with specular components of an image; and FIGS. 6A-1 through 6B comprise diagrams and a flow chart describing a procedure for processing in connection with shadows cast by an obstruction.

DETAILED DESCRIPTION OF AN ILLUSTRATIVE EMBODIMENT

Figure 1:
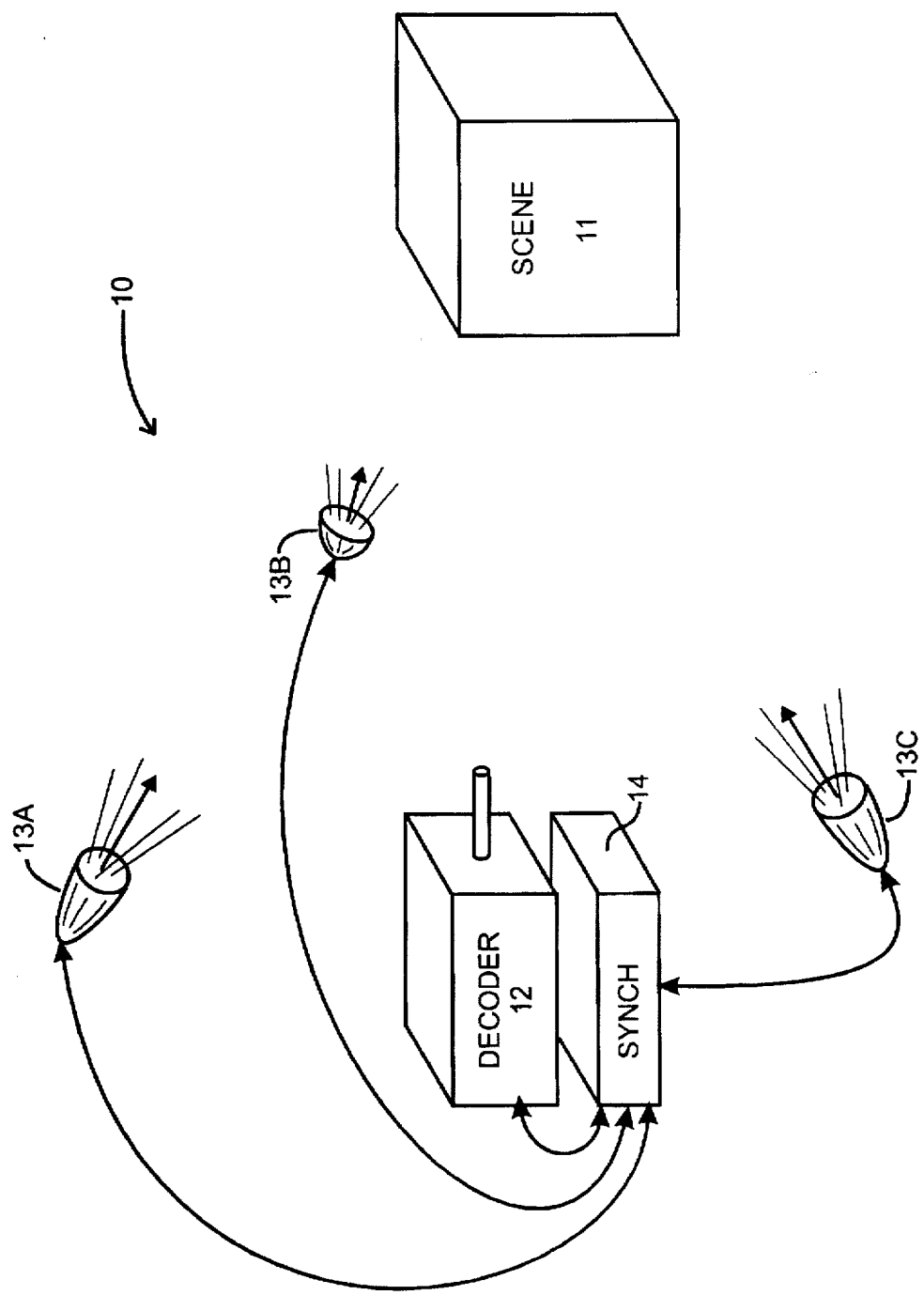
FIG. 1 is a general diagram illustrating, in stylized form, an arrangement for recording a scene constructed in accordance with the invention.

FIG. 1 is a general diagram illustrating, in stylized form, an arrangement 10 for recording a scene 11 constructed in accordance with the invention, from which an arrangement, described below in connection with FIGS. 2 through 4, may be used to produce a rendered image of the scene 11. Although not specifically shown in FIG. 1, the scene 11 may comprise a number of objects or persons whose image is to be recorded and produced.

With reference to FIG. 1, the recording arrangement 10 includes a recording device 12, at least three light sources 13A, 13B and 13C (generally identified by reference numeral 13) and a synchronizer 14. The recording device 12 may comprise any device which will record a visual image, and may include for example, a photographic camera, such as a motion picture camera or a still camera which records the image on film, or a video camera which may record the image in either analog or digital form on, for example, magnetic tape. A single recorded image produced by the recording device 12 will be termed herein a "frame". As will be described below, multiple frames, preferably taken in generally rapid succession, are used in generating a single rendered image, and thus if the recording device is a still camera, it should be capable of generating at least three frames, preferably in rapid succession.

The light sources 13 are situated to illuminate the scene 11 from a plurality of directions. In particular, the light sources 13 are preferably situated with respect to the scene 11 so that the directions from which they illuminate the scene 11, as indicated by the respective arrows 15A, 15B and 15C (generally identified by reference numeral 15) are not co-planar. The arrows 15 will be termed here "illumination vectors," with the direction of each arrow identifying the direction of illumination of the light source onto scene 11 and the length of the arrow representing a measure of the relative intensity of the illumination provided by the light source.

The synchronizer 14 controls the energization of the light sources 13 and the recorder 12, synchronizing the successive energization of the light sources to facilitate the recording of successive frames by the recording device 12. Preferably, the synchronizer iteratively energizes the light sources 13A, 13B and 13C in rapid succession corresponding to the recording of successive frames by the recording device 12. If the recorder 12 is a motion picture or video camera, in which multiple images are to be rendered, the synchronizer repeatedly initiates the iterative generation of the light sources, contemporaneous with the recording of successive frames by the recording device 12. In that case, each set of three successive frames, with each frame within a set being taken synchronously with a different light source 13, will be used to render one image, and sequential sets of frames will be used to render sequential images. Thus, every third frame in a series of frames as recorded by the recording device will be of the scene 11 as illuminated primarily by one of the light sources 13A, 13B or 13C, with three successive frames in the series of frames will be of the scene 11 as illuminated by all three light sources 13A, 13B and 13C. It will be appreciated that the particular order in which the synchronizer 14 energizes the light sources 13 is not important, but in synchronizing for each of the successive three-frame iterations the synchronizer preferably energizes the light sources 13A, 13B and 13C in the same order. The purpose for this will be clear from the description of the image rendering operation below in connection with FIG. 2.

The arrangement 10 provides one or more sets of three frames of the scene 11, with each frame in the set being of the scene 11 as illuminated by a different light source 13. It will be appreciated that, if the recording device 12 is a still camera, the arrangement 10 will generally provide one set of three frames, all of which are used to render a single image. On the other hand, if the recording device 12 is a motion picture or video camera, the arrangement 10 will generally provide a series of three-frame sets, with each set being used to render a single image. The series of images thus rendered constitute the motion picture.

The light sources 13 may comprise any conventional light sources. It will be appreciated, however, that it is preferable that the light sources 13 be quickly energizable and de-energizable, that is, that they quickly turn on and off, particularly if the recording device 12 is a motion picture or video camera. In a typical motion picture, it is desired to produce on the order of twenty-four rendered images per second, in which case the light sources 13 would be turned on and off in on the order of one-seventy-second of a second. Similarly, for video the number of rendered images to be displayed is thirty per second, in which case the light sources would be turned on and of in on the order of one-ninetieth of a second. A light source 13 need not, however, be completely dark at the end of its energization period. Any residual light produced by a light source 13 at the end of its energization period, and during the energization period of another light source 13 only make it appear that the later-energized light source was displaced by a small amount from its actual position. In that case, the apparent placement of the later-energized light source, which will be termed its apparent illumination vector, reflect the vector sum of the illumination vector of the later-energized light source and the illumination vector of the light source being de-energized, which because of its reduced intensity will be relatively small. It will be appreciated that, of the light sources are all similar, all would appear to have the same degree of displacement, in which case they would still appear to be non-co-planar.

It will further be appreciated that the arrangement 10 may have additional light sources and that multiple light sources may be energized while the recording device 12 is recording a frame of a three-frame set. In that situation, the resultant light vector of the light produced by the light sources energized while recording the frame is the vector sum of the light vectors of the individual light sources, which resultant light vector should be non-co-planar with the light vectors of the light sources 13 energized while the other frames of the set are recorded. This arrangement may be particularly useful if, for example, it is believed that the orientation of the multiple light sources is what is desired for the final rendered image when the image is being recorded, but the other frames may be retained in case a different orientation is later determined to be desirable.

Figure 2:
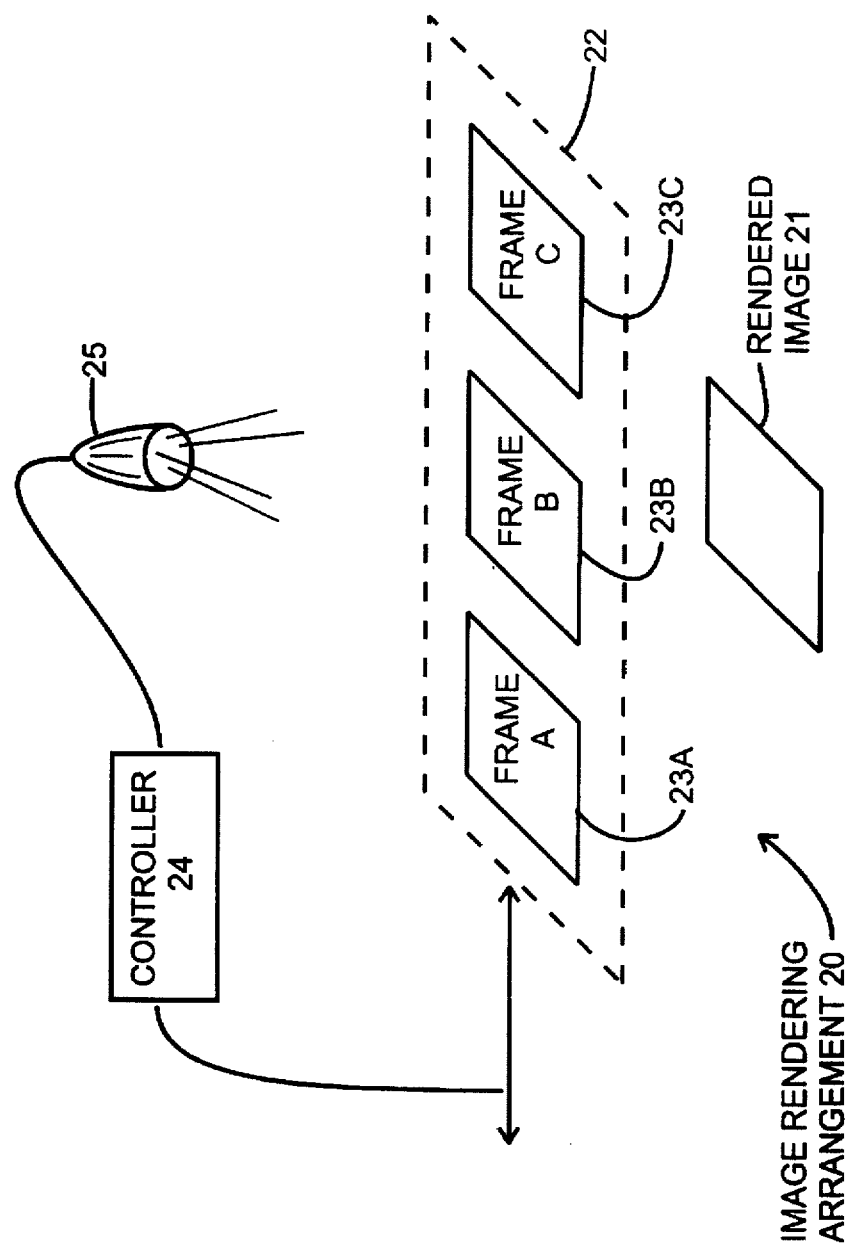
FIG. 2 is a general diagram illustrating an arrangement for photographically generating a rendered image constructed in accordance with the invention.

FIG. 2 is a general diagram illustrating one arrangement 20 for photographically generating a rendered image constructed in accordance with the invention. The arrangement 20 may find greatest utility in connection with arrangements in which the frames are recorded photographically, on film for example. With reference to FIG. 2, the arrangement 20 generally includes a support 22 for supporting the three frames 23A, 23B and 23C (generally identified by reference numeral 23) of a set as generated by the recording device 12 in recording arrangement 10. The three frames may correspond to those recorded by the recording device 12 during illumination by the respective light sources 13A, 13B and 13C, respectively, for example. A controller enables the support to be moved so that each of the frames 23 passes between a light source 25 and recording material 21 upon which the rendered image is recorded. When each frame 23 is so situated, the controller 24 energizes the light source, enabling the recording material 21 to be exposed in accordance with the image recorded on the frame 23. It will be appreciated that the arrangement 20 may also include suitable conventional lenses (not shown) for maintaining the image on the recording material 21, as provided by the respective frames 23 in focus.

The controller 24 may control the amount of illumination provided by the light source 25 and vary it as among the various frames 23A, 23B and 23C. If the controller 24 maintains the illumination constant, it will be appreciated that the rendered image as recorded by recording material 21 will appear as though the scene 11 had been constantly illuminated by a light source whose apparent illumination vector is the vector sum of the individual illumination vectors 15 of the three light sources 13. However, if the controller 24 energizes the light source 25 so to have a brighter illumination for, for example, frame 23A taken during energization of light source 13A, than for the other frames, the rendered image as recorded by the recording material 21 will appear as though the scene had been illuminated by a light source having predominantly an apparent illumination vector close to that of illumination vector 15A, provided by light source 13A. Similarly, if controller 24 energizes light source 25 so as to have a brighter illumination for frame 23B or 23C, the rendered image will appear to be illuminated by a light source having an apparent illumination vector close to that of illumination vectors 15B or 15C provided by light source 13B or 13C. Similarly, the controller 24 can facilitate generation of the recorded image so that it appears that the scene 11 was illuminated by a light source providing an apparent illumination vector of any direction by appropriate selection of relative intensity levels of the light source 25 for the respective frames 23A, 23B and 23C.

It will be appreciated that, if each of the arrows 15A, 15B and 15C is considered a illumination vector $I_A$, $I_B$, and $I_C$, respectively, the effect of the rendering operation is to create a rendered image on material 21 which has the appearance of scene 11 illuminated from an apparent illumination vector $I_R$ which has the value $$I_R = aI_A + bI_B + cI_C \qquad \{\text{Eqn. 1}\}$$

where "a," "b," and "c" represent coefficients and "+" represents the vector addition operation. The values of "a," "b" and "c" are directly proportional to the relative intensities of the light source 25 as energized by the controller 24 while exposing the material 21 to the frames 23A through 23C. As noted above, the directions 15A, 15B and 15C of the light sources 13A, 13B and 13C should not be co-planar, otherwise it will be appreciated from Eqn. 1 that the apparent illumination vector $I_R$ will of necessity also be co-planar, and so the apparent light source direction would be limited to the plane defined by the actual illumination vectors. However, if in a particular application it is sufficient that any apparent illumination vector be limited to the plane defined by the source vectors, this restriction need not be observed.

Figure 3:
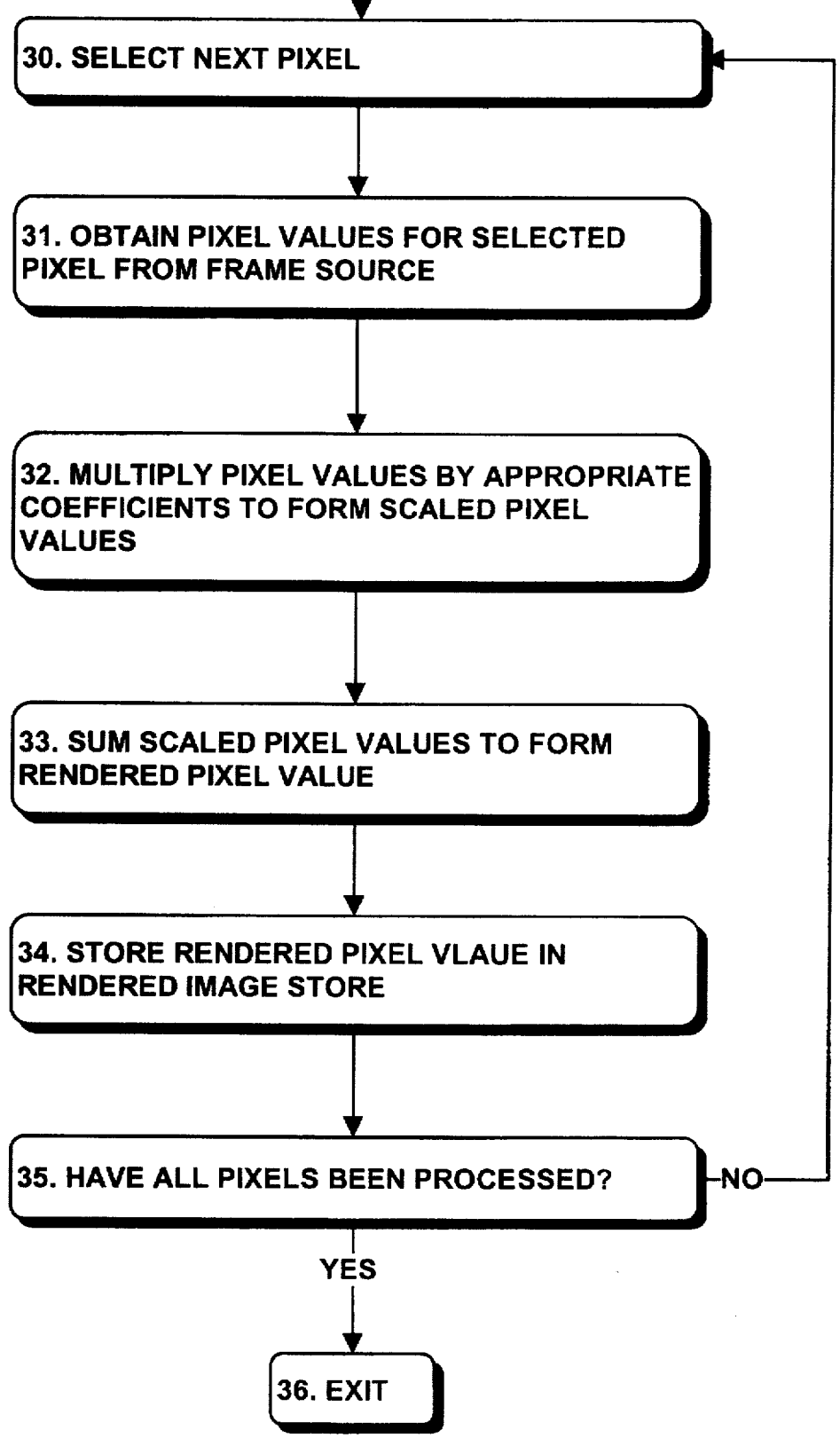
FIG. 3 is a flow chart depicting a procedure, which may be used by a digital computer, for example, for generating an electronically-recorded rendered image.
Figure 4:
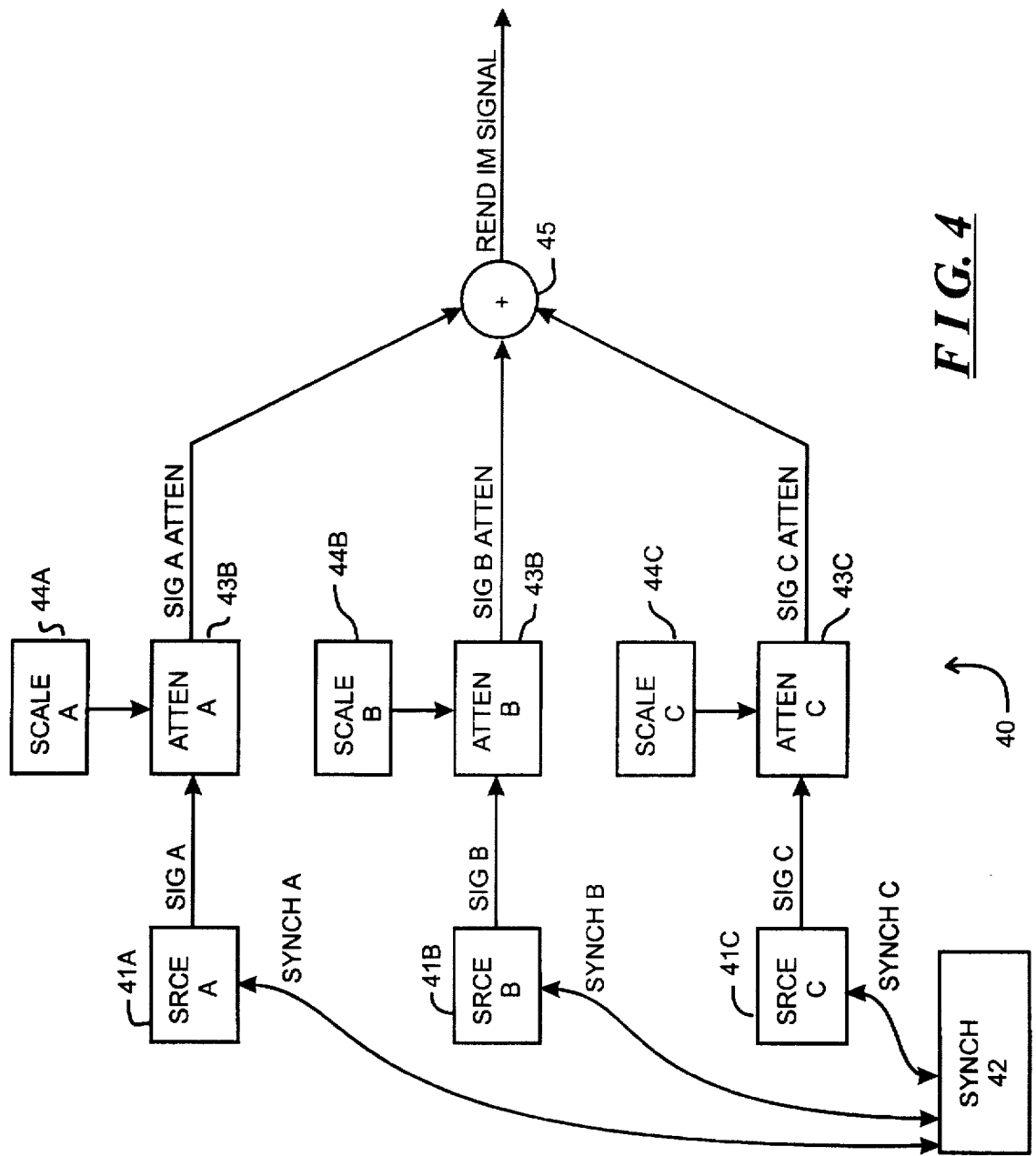
FIG. 4 depicts, in functional block diagram form, an arrangement 40 which may be used in for generating an electronically-recorded rendered image in analog form.

If the recorder 12 (FIG. 1) has recorded the frames in digital form, or if they have otherwise been rendered into digital form, a digital rendered image may be created by, for example, a digital computer according to the flow chart depicted in FIG. 3. It will be appreciated that, if the frames are in either analog or digital form, the respective frames as produced by the recorder 12, as well as the rendered image, will be divided into a plurality of picture elements, or "pixels", with each pixel having a numerical value representing the intensity of the illumination at the corresponding point in the image as provided by the light source 13 that was energized at the time the image was recorded. If the frames and rendered image are in color, typically each pixel will have three such values, each representing the intensity of one of the primary colors of the light spectrum representing the color and luminance of that pixel. The pixel values will be stored in conventional memory devices (not shown) if the frames are in digital form. Alternatively, if the frames are in analog form, the pixel values may be represented by a analog signal recorded onto magnetic tape, for example, with the amplitude of the analog signal representing the pixel values. The memory devices and magnetic tape, along with any other mechanisms in which the pixel values may be stored, comprise sources of pixel information for the respective pixels in the frames as recorded by the recording device 12.

With reference to FIG. 3, the operations depicted in that Fig. are performed on the pixel values for the successive pixels in a series of iterations, all of the pixel values for a particular pixel being processed during a particular iteration. Continuing with the example in which the operations depicted in FIG. 3 are performed by a digital computer (not shown), the computer initially selects a pixel (step 30) and obtains the three pixel values for that pixel from the respective frame sources, that is, either the memory devices or the magnetic tape (step 31). The computer thereafter multiplies the pixel values by the appropriate coefficients to form scaled pixel values (step 32) and adds the scaled pixel values together to form a single rendered pixel value (step 33). The computer may thereafter store the rendered pixel value in a rendered image store (step 34), which, like the frame store, may comprise, for example, digital memory devices, if the pixel values are represented digitally by numerical values, or magnetic tape if the pixel values are represented by digital or analog signals. The computer then determines if pixel values for all of the pixels of the frames have been processed (step 35) and, if not, returns to step 30 to process pixel values for the next pixel. It will be appreciated that at some iteration the computer will have processed the pixel values for all of the pixels, and will determine in step 35 that all pixels have been processed. At that point, the computer will sequence to step 36, in which it will exit the routine depicted in FIG. 3.

It will be appreciated that the computer will perform the operations depicted on FIG. 3 in connection with each set of three frames associated with a rendered image. If the recorder 12 has produced multiple three-frame sets from which multiple rendered images are to be produced, as will be the case in a motion picture, for example, the operations depicted in FIG. 3 will be performed in connection with each set, thereby producing a plurality of rendered images.

If the recording device 12 comprises, for example, a video camera which produces frames comprising respective analog signals, the signals from the respective three-frame sets associated with a particular rendered image may also be processed by electronic apparatus to produce an analog signal representing the rendered image. FIG. 4 depicts, in functional block diagram form, an arrangement 40 which may be used in that connection. With reference to FIG. 4, the arrangement 40 includes three signal sources 41A, 41B, and 41C (generally identified by reference numeral 41), which produce analog SIG A signal source "A", SIG B signal source "B" and SIG C signal source "C" signals associated with respective frames produced by the recording device 12 and whose amplitudes are related to the pixel values of the respective frames at corresponding pixels.

If, for example, the recording device 12 records the analog video signal on magnetic tape, the signal for respective frames may be recorded onto separate tapes, which may be retrieved by recording heads associated with the respective signal sources 41. That is, the tape provided to signal source 41A may contain the sequential frames recorded by recording device 12 while light source 13A is energized, the tape provided to signal source 41B may contain sequential frames recorded while light source 13B is energized, and that tape provided to signal source 41C may contain sequential frames recorded while light source 13C is energized. Alternatively, if the signals associated with the frames are recorded sequentially on a single tape, the signal sources 41 may include a single combined playback mechanism with three separate playback heads, which are spaced apart so that when the portion of the tape associated with one frame is received by, for example, the playback head associated with signal source 41A, the signal associated with the corresponding part of the other frames are received by the playback heads associated with the other signal sources 41B and 41C.

In either case, a synchronizing circuit 42 produces SYNCH A synchronizing source "A", SYNCH B synchronizing source "B" and SYNCH C synchronizing source "C" signals to ensure that the SIG A, SIG B and SIG C signals produced by the respective signal sources 41 are related to the corresponding pixels in the frame set. The SIG A, SIG B and SIG C signals are coupled to respective attenuator circuits 43A, 43B and 43C (generally identified by reference numeral 43). The attenuator circuits 43 generate respective output SIG A ATTEN signal source "A" attenuated, SIG B ATTEN signal source "B" attenuated, and SIG C ATTEN signal source "C" attenuated signals which have respective amplitudes corresponding to the amplitude of the input SIG A, SIG B and SIG C signals, as scaled by a factor stored in respective scaling value stores 44A, 44B and 44C (generally identified by reference numeral 44). The scaling operation performed by the attenuators 43 essentially corresponds to a multiplication operation, in which the amplitude of the respective output signal SIG A ATTEN, SIG B ATTEN, and SIG C ATTEN corresponds to the amplitude of the respective SIG A, SIG B and SIG C signal, multiplied by the scaling factor value stored in the scaling value stores 44. It will be appreciated that the values stored in the scaling stores 44 essentially correspond to the appropriate coefficients as described above in connection with FIGS. 2 and 3.

The SIG A ATTEN, SIG B ATTEN and SIG C ATTEN signals are coupled to a signal adder 45, which generates a REND IM SIGNAL rendered image signal whose amplitude at any point in time corresponds to the sum of the amplitudes of the SIG A ATTEN, SIG B ATTEN and SIG C ATTEN signals at the same point in time. If desired, the signal adder 45 may be connected to a magnetic tape recorder or other recording mechanism to facilitate recording of the REND IM SIGNAL rendered image signal for later use.

It will be appreciated that other arrangements may be used to generate rendered images from frames as recorded by the recording arrangement depicted in FIG. 1. The arrangements described in connection with FIGS. 2, 3 and 4 are illustrative of the general techniques and arrangements which may be implemented and used.

It will further be appreciated that precise and accurate rendering of a series of images, such as for a motion picture, from the corresponding frames will be related to the particular coefficients "a," "b" and "c" as determined for Eqn. 1, as that will determine the relative contributions from the three-frame series to be used for each rendered image. The particular coefficients, however, will be precisely and accurately valid for particular positions of light sources 13 and recording device 12, and may change if their respective positions change. It may accordingly be desirable to provide the recording device 12 and light sources 13 with motion sensors to record if and when they are moved, in relation to the recording of each three-frame series, to indicate when movement occurs, to, in turn, indicate when, if it is deemed necessary, the coefficients should be re-determined.

Several procedures may be used to determine the appropriate coefficients or scaling factors to be used in the procedure or arrangement described in connection with FIGS. 3 and 4, or the relative intensities of the light source 25 to be used in exposing the frames 23 as described in connection with FIG. 2. It will be appreciated that a trial-and-error procedure may be used, in which an operator initially selects values, generates a rendered image and determines its suitability, which procedure is repeated if the rendered image is determined to be unsuitable.

In another procedure, a single reference frame is recorded with the light sources in the appropriate setting; that is, the lighting of the reference frame corresponds to the desired lighting of the rendered image, or images if a motion picture. The three-frame sets are related to the reference frame by the equation:

$$I_N(x,y) = C_A I_A(x,y) + C_B I_B(x,y) + C_C I_C(x,y) \quad \{\text{Eqn. 2}\}$$

where the "$I_N$" is the desired lighting vector of the reference frame, and thus the desired lighting of the rendered image, and $C_A$, $C_B$ and $C_C$ are the coefficients which must be determined. By obtaining luminance levels of three or more points on the reference frame and corresponding points on the source frames, three equations may be set up from which the unknowns $C_A$, $C_B$ and $C_C$ can be determined in a conventional manner.

In yet another procedure, the coefficients may be determined directly without generating a reference frame, if the desired lighting vector is selected. In that procedure, the apparent lighting vectors are first determined from a frame set. In this procedure, the apparent lighting vectors of the frames of the frame sets are not taken as the respective lighting vectors 15 of the light sources 13 energized during the taking of the frames of the frame sets, since, as noted above, delays in de-energization of the light sources 13 at the end of their respective energization periods may make the apparent lighting vectors differ from the actual lighting vectors 15 of the respective light sources 13. In that case, three corresponding points $P_i=(x_i,y_i)$, i=1, 2, 3 . . . , on the frames are selected, whose orientations and reflectance coefficients representing the length of the vector "n" relative to the recording device 12 are known. Thus, $$I_A(x_i,y_i) = n_{pi} \cdot S_A \quad \{\text{Eqn. 3A}\}$$

$$I_B(x_i,y_i) = n_{pi} \cdot S_B \quad \{\text{Eqn. 3B}\}$$

$$I_C(x_i,y_i) = n_{pi} \cdot S_C \quad \{\text{Eqn. 3C}\}$$

where $S_A$, $S_B$ and $S_C$ represent the apparent lighting vectors, and "." represents the dot product with "$n_{pi}$", the orientation of the respective point relative to the recording device 12. Equations 3A through 3C jointly provide at least nine equations with nine unknown values, which can be solved by conventional techniques.

After the apparent lighting vectors $S_A$, $S_B$ and $S_C$ have been determined, since the orientation and magnitude of the desired lighting vector is known, the desired lighting vector can be expressed as a sum of the apparent lighting vectors:

$$D = aS_A + bS_B + cS_C \quad \{\text{Eqn. 4}\}$$

where "a", "b" and "c" are the required coefficients.

It will be appreciated by those skilled in the art that the arrangements described above are particularly useful in connection with scenes whose surfaces are primarily matte or diffuse, that is, those surfaces whose reflective properties follow Lambert's law, which states that $$I_N(x,y) = E \times p \times \cos(n,s) \quad \{\text{Eqn. 5}\}$$

where $I_N$ is the intensity of light as reaching the observer from a light source supplying light from a direction of vector "s," "E" is the intensity of the light source in the direction of vector "s," "p" is the albedo of the surface, and "(n,s)" refers to the angle between the vector "s" and the vector normal to the surface. Otherwise stated, if the normal vector is taken as having the magnitude of the value of the albedo, and "." represents the dot product, Lambert's law, as expressed in Eqn. 5 can be rewritten $$I_N(x,y) = n \cdot s \quad \{\text{Eqn. 5a}\}$$

See B. K. B. Horn, *Machine Vision* (MIT Press, 1979). Most types of surfaces are predominately matte or diffuse, and the arrangements will suffice for the components of the reflected light that conform to the Lambert's law. As a result of Lambert's law, for those surfaces in a scene which are matte, the intensities of the illumination from any light source from any direction will be a linear combination of the actual light sources with which the scene is recorded.

The arrangements described above can also be used in connection with components of the reflected light that do not conform to Lambert's law. These non-Lambertian components, which are termed herein "specular components," can be handled by:

(a) first removing the specular components from the frames, which leaves the Lambertian components in the frames, (b) second, processing the Lambertian components, as described above in connection with FIGS. 2 through 4 in connection with a desired apparent lighting vector to form a Lambertian rendered image, and (c) third, selectively adding specular components as highlights in appropriate locations, as determined by the same apparent lighting vector which was used in processing the Lambertian components, to form the completed rendered image.

Figure 5B:
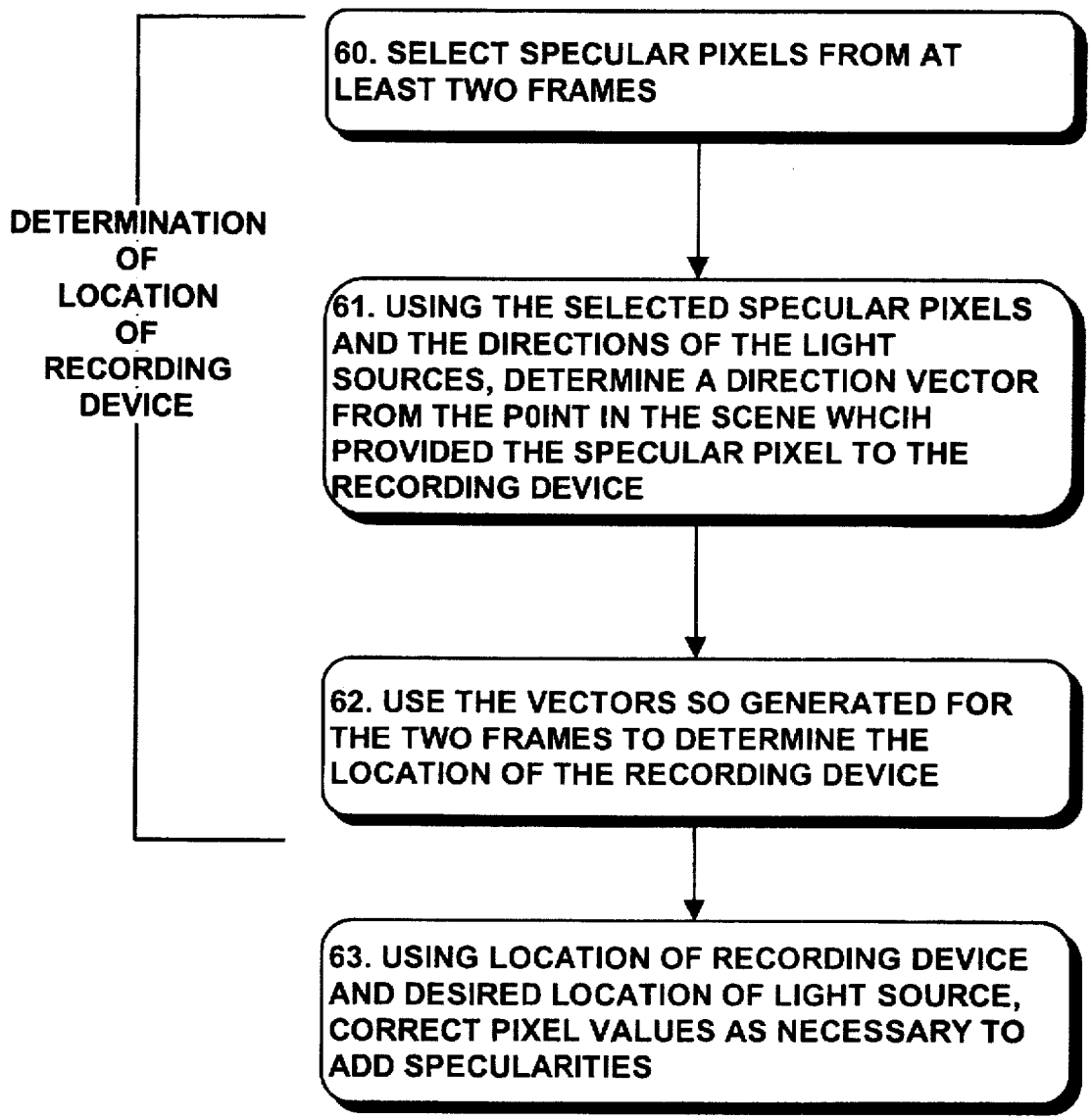

These operations will be explained in detail in connection with FIGS. 5A and 5B, which comprise a flow chart describing a procedure for processing in connection with specular components of an image. With reference to FIG. 5A, the recording arrangement 10 provides four frames instead of three, using four diverse light sources 13, each light source being energized for one of the four frames (step 50). This will produce frames which, for pixels which are of surfaces which are not specular, which will normally characterize the large majority of the pixels, are linearly related, that is, the illumination vectors follow the relation that $$V_D = C_A V_A + C_B V_B + C_C V_C \quad \{\text{Eqn. 6}\}$$

where "$V_i$" is the pixel value of the "i-th" frame. The values for coefficients $C_A$, $C_B$, and $C_C$ can be determined by selecting at least three corresponding points on all four frames which do not appear to be specular (step 51), determining pixel values for them to create corresponding equations, and solving the equations using conventional techniques (step 52). Non-specular points on the frames can be determined by visual inspection of the frames. Alternatively, average pixel values for each frame can be determined, and points one the frames whose pixel values are at, near, or below the average values can be identified as non-specular.

After the coefficients a, b and c have been determined, Equation 6 is applied to all pixels of the frames to identify those pixels which satisfy the equation, to within a selected threshold value "t" (step 53). For each pixel (x,y) which does not satisfy the equation, an error value "E" is determined:

$$E = V_D(x,y) - \{C_A V_A(x,y) + C_B V_B(x,y) + C_C V_C(x,y)\} \quad \{\text{Eqn. 7}\}$$

which error value E, if it is above the threshold value "t," is subtracted from the pixel value of the frame in which the pixel is determined to be specular, that is, the frame "i" in which pixel value of the corresponding pixel (x,y) is largest to generate a corrected pixel value (step 54):

$$V_i'(x,y) = V_i(x,y) - (1/C_i)E \quad \{\text{Eqn. 8}\}$$

The pixel values $V_i'$ of the frames as thus corrected are those in which the specular components have been removed, and thus only have the Lambertian components. The corrected frames are then processed as described above in connection with FIGS. 2 through 4 (step 55), and specular high-lights added as required by the desired lighting position (step 56), as will be described in connection with FIG. 5B.

With reference to FIG. 5B, in the procedure for adding the specular highlights, the location of the recording device relative to the light sources is first determined in a series of steps 60 thorough 62. This operation can be performed in connection with two frames containing specular pixels. In this operation, pixels identified as being specular are selected (step 50). For the selected specular pixels from each frame, and the directions of the light sources energized to record the frames, the direction from the scene 11 to the recording device is determined, using the fact that the specular component represents the reflection of the light from the light source off the surface in the scene to the recording device (step 61). The actual location of the recording device is the intersection the vectors determined in step 61 for the two frames (step 62). From the location of the recording device 12 and the location of the desired light source, specularities are added to the scene using the mirror-reflection law.

In addition, the arrangements described above in connection with FIGS. 1 through 4 will be most particularly useful in connection with a scene 11 in which the light sources 13 do not produce dark shadows, that is, in which the recording device 12 records at least some light across the entire frame recorded while the respective light source 13 is energized. A determination of whether a region of a rendered image will be in shadow, and the boundaries of the respective shadows, can be determined from the original frames from the apparent positions of the light sources are determined as described above in connection with Eqns. 3A, 3B and 3C, and the desired position of the light source.

In that case, the change of the position of the boundary of a shadowed region between a frame and a rendered image, in relation to the change in position of the light source energized during recording of the frame and the desired light source position, is in proportion to the tangents of the incident angles of the energized light source and the desired light source with respect to the shadowed surface. That is:

$$\tan(b)/\tan(a) = l_e/l_b \quad \{\text{Eqn. 9}\}$$

where "b" is the incident angle of the energized light source on the shadowed surface, "a" is the incident angle of the desired light source on the shadowed surface. In Eqn. 9, "$l_b$," is the position of the boundary of the shadow due to the energized light source, in particular, the distance from the location of the distance along the shadowed surface, from a position at which the element of the scene casting the shadow is directly above the surface, to the boundary of the shadow as depicted in the frame. In addition, "$l_a$" is is the position of the boundary of the shadow due to the desired light source, in particular, the distance from the location of the distance along the shadowed surface, from a position at which the element of the scene casting the shadow is directly above the surface, to the boundary of the shadow cast due to the desired position of the light source. Thus, the boundaries of the shadowed regions in the rendered image can easily be determined using Eqn. 9.

Figures 2, 6A:
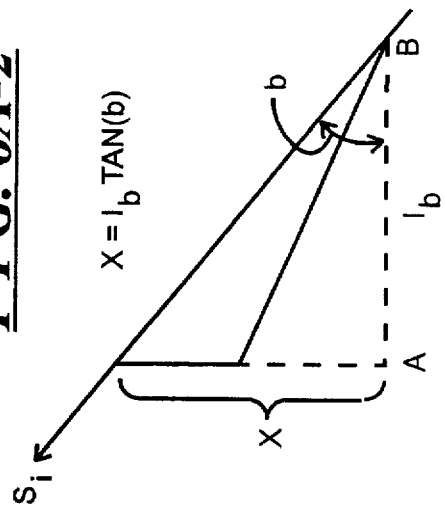
Figures 3, 6A:
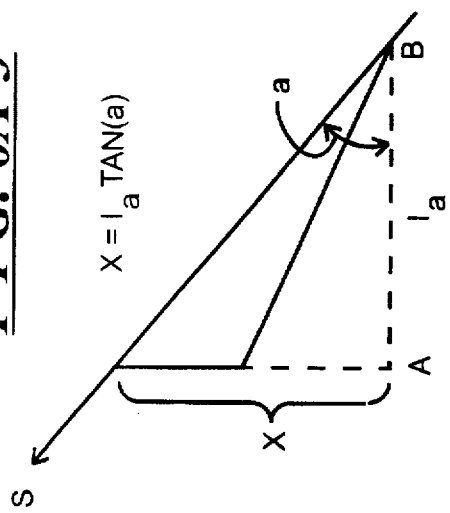
Figures 1, 6A:
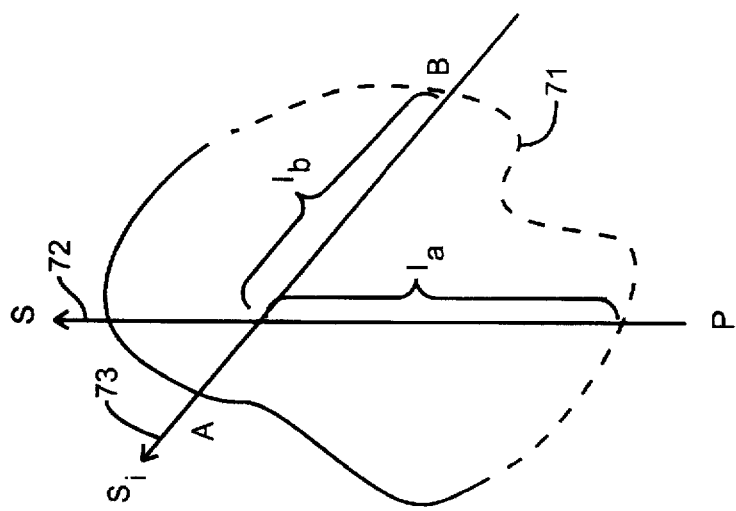
Figure 6B:
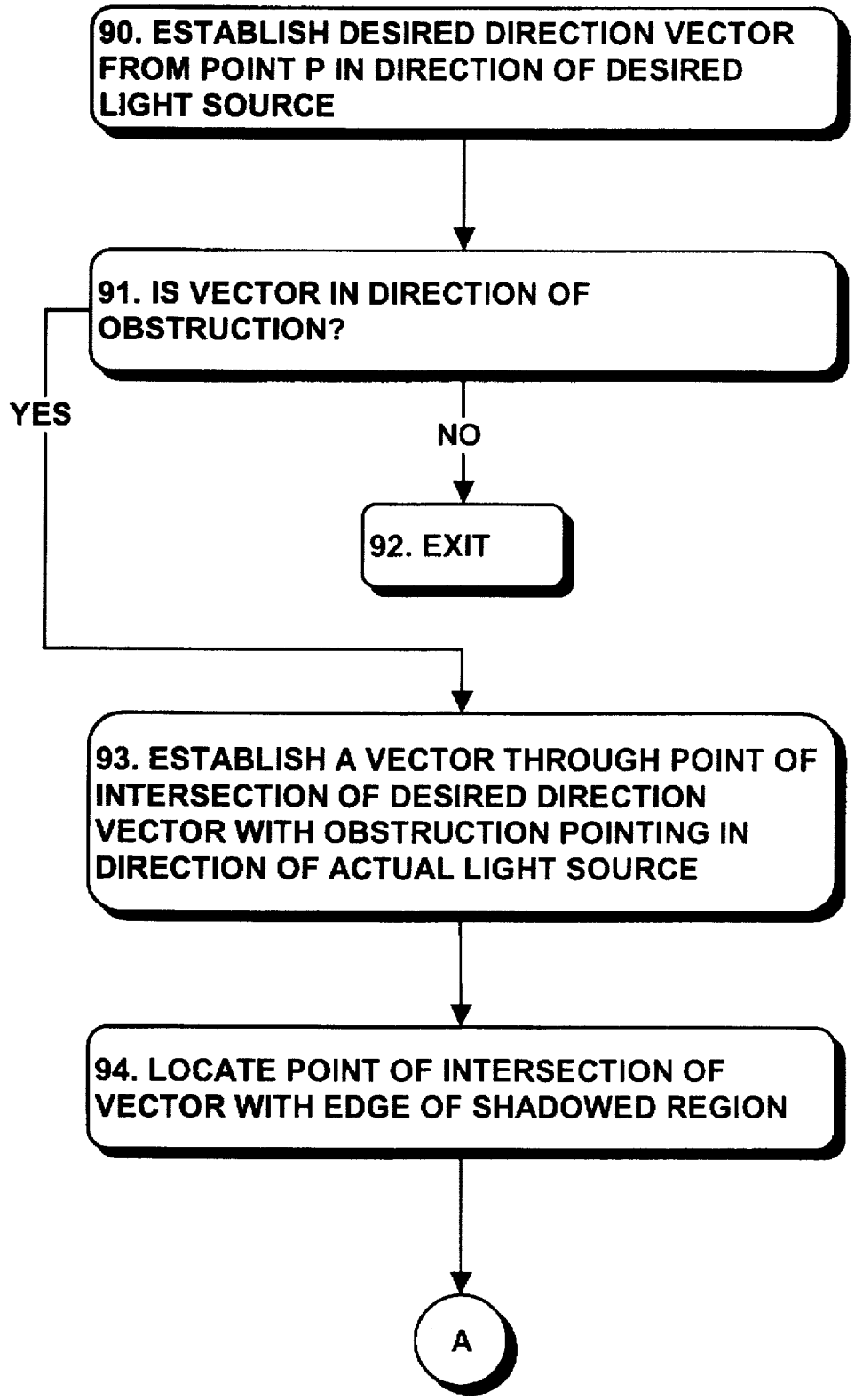

These operations will be described in more detail in connection with FIGS. 6A-1 through 6A-3 and 6B, which comprise diagram and a flow chart describing a procedure for processing in connection with shadows cast by an obstruction. With reference to FIG. 6A-1, an obstruction, represented by solid line 70, casts a shadow having a boundary represented by dashed line 71, when illuminated by a light source from a direction represented by arrow $S_i$. With a desired light source represented by arrow S, to be determined is whether point P is in shadow as a result of the obstruction 70. To make that determination, a series of operations as depicted in the flow chart of FIG. 6B is performed. Initially, a desired direction vector 72 is established from the point P in the direction of the desired light source (step 90). A determination is then made as to whether the vector 72 intersects the obstruction 70 (step 71). If the vector 72 does not intersect the obstruction 70, the point P will not be obscured by the desired light source and so the procedure may at that point be exited (step 92). On the other hand, if the vector 72 does intersect the obstruction 70, the procedure sequences to step 93.

If the vector 72 intersects the obstruction 72, initially a vector 73 is established through the intersection point "A" in the direction of the actual light source $S_i$. The intersection point "B" with the edge of the shadowed region (step 94). The height of the obstruction at point A is determined (reference FIGS. 6A-2 and 6A-3). In that connection, using the distance $l_b$ between intersection points A and B and the angle "b" of the actual light source Si, the height of the obstruction "x" is the $l_b$ times the tangent of angle "b" with the horizontal plane. If point P is on the boundary of the shadowed region as would be created by the desired light source S, and if at that point P the desired light source S makes an angle "a" with the horizontal plane, then the height "x" is also $l_a$ times the tangent of angle "a" (step 95). If the point P is actually further from point A than this distance $ll_a$, it will not be in shadow; however, if point P is less than the distance $l_a$ it may be ha shadow. Step 95 is repeated for all frames and actual light sources (step 96) and if point P is determined to be closer to point A than $l_a$ for all actual light sources, it will be in shadow, and otherwise not (step 97).

It will be appreciated that the invention provides a quick and inexpensive means of enabling generation of rendered images from scenes in which the desired position light source differs from the actual positions of any of the light sources from which the actually-recorded images were actually recorded. The invention can give photographers, film directors, and others who need to produce images of desired visual effects, generating diverse moods among viewers, a significant amount of control over the position of the lighting of the images that they create, after the images have been recorded.

It will also be appreciated that the operations described above in connection with FIGS. 2 through 6B can be performed manually, or in connection with a suitably programmed computer, whose programming will be readily apparent to those of ordinary skill in the art from the descriptions herein.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. An image rendering system for generating a rendered image which reflects a desired light source position in response to frame image information relating to a series of frames recorded in response to a light sources having diverse positions, the image rendering system comprising:
   A. a frame store for storing the frame image information for each of the series of frames, the frame image information having a specular component and a non-specular component;
   B. a rendered image store for receiving rendered image information representing a rendered image; and
   C. a rendered image information generator comprising:
      i. a specular correction portion for generating from the frame image information intermediate image information representing the non-specular component of the frame image information; and
      ii. a non-specular rendered image information generator for generating rendered image information for storage in response to intermediate image information store related to frames of the series as recorded in synchrony with diverse ones of the light sources, the non-specular rendered image information generator generating the rendered image information in relation to the intermediate image information for each of the frames, as weighted in relation to the relationship between the position of the light sources with which each of the frame was recorded and the desired position of the light source for the rendered image.

2. An image rendering system as defined in claim 1 in which the specular correction portion comprises:
   A. a relationship-determining portion for determining a linear relationship among non-specular portions of the frame image information of the frames;
   B. an error value determining portion for determining pixel error values in response to differences between the determined linear relationship and actual pixel values of the frames for each pixel; and
   C. a correction generating portion for generating a corrected pixel value in response to the actual pixel values and the pixel error values.

3. An image rendering system as defined in claim 1 wherein the rendered image information generator further comprises a specular addition component for adding specular pixel values to selected pixels of the rendered image information generated by the non-specular rendered image information generator.

4. An image rendering system as defined in claim 3 wherein the specular addition component includes:
   A. a recording device locator for identifying a location of a recording device which recorded the frames;
   B. a desired light source position identifier for identifying a position of the desired light source; and
   C. a specular component adder for adding a specular component in response to the location of the recording device as identified by the recording device locator and the position of the desired light source.

5. An image rendering system for generating a rendered image which reflects a desired light source position in response to frame image information relating to a series of frames recorded in response to a light sources having diverse positions, the image rendering system comprising:
   A. a frame store for storing the frame image information for each of the series of frames, the frame image information having a shadowed region and an unshadowed region;
   B. a rendered image store for receiving rendered image information representing a rendered image; and
   C. a rendered image information generator comprising:
      i. a non-shadowed rendered image information generator for generating rendered image information for storage in response to intermediate image information store related to frames of the series as recorded in synchrony with diverse ones of the light sources, the non-shadowed rendered image information generator generating the rendered image information in relation to the intermediate image information for each of the frames, as weighted in relation to the relationship between the position of the light sources with which each of the frame was recorded and the desired position of the light source for the rendered image; and
      ii. a shadowed-region determining element for identifying from the shadowed region portion of the frame image information shadowed portions of the rendered image information.

6. A method of generating a rendered image which reflects a desired light source position in response to frame image information relating to a series of frames recorded in response to a light sources having diverse positions, the method comprising the steps of:
   A. generating from the frame image information intermediate image information representing the non-specular component of the frame image information; and
   B. generating the rendered image information in response to intermediate image information store related to frames of the series as recorded in synchrony with diverse ones of the light sources, the rendered image information being generated in relation to the intermediate image information for each of the frames, as weighted in relation to the relationship between the position of the light sources with which each of the frame was recorded and the desired position of the light source for the rendered image.

7. A method as defined in claim 6 in which the rendered image information generation step includes the steps of:
   A. determining a linear relationship among non-specular portions of the frame image information of the frames;

B. determining pixel error values in response to differences between the determined linear relationship and actual pixel values of the frames for each pixel; and C. generating a corrected pixel value in response to the actual pixel values and the pixel error values.

8. A method as defined in claim 7 wherein the rendered image information generation step further includes the step of adding specular pixel values to selected pixels of the rendered image information generated by the non-specular rendered image information generator.

9. A method defined in claim 8 wherein the specular addition step includes the steps of:

A. identifying a location of a recording device which recorded the frames;

B. identifying a position of the desired light source; and

C. adding a specular component in response to the location of the recording device and the position of the desired light source.

10. A method of generating a rendered image which reflects a desired light source position in response to frame information relating to a series of frames recorded in response to a light sources having diverse positions, the method comprising the steps of:

A. generating rendered image information for storage in response to intermediate image information store related to frames of the series as recorded in synchrony with diverse ones of the light sources, the rendered image information being generated in relation to the intermediate image information for each of the frames, as weighted in relation to the relationship between the position of the light sources with which each of the frame was recorded and the desired position of the light source for the rendered image; and B. identifying from the shadowed region portion of the frame image information shadowed portions of the rendered image information.

* * * * *